Dec. 24, 1968     C. F. STUART     3,417,886
IMPLEMENT HITCH FOR TRACTORS AND LOADERS
Filed June 7, 1967     4 Sheets-Sheet 1

INVENTOR.
CLIFTON F. STUART
BY
Brown, Critchlow, Flick & Peckham
ATTORNEYS.

Dec. 24, 1968    C. F. STUART    3,417,886
IMPLEMENT HITCH FOR TRACTORS AND LOADERS
Filed June 7, 1967    4 Sheets-Sheet 2

INVENTOR.
CLIFTON F. STUART
BY Brown, Critchlow,
Flick & Peckham
ATTORNEYS.

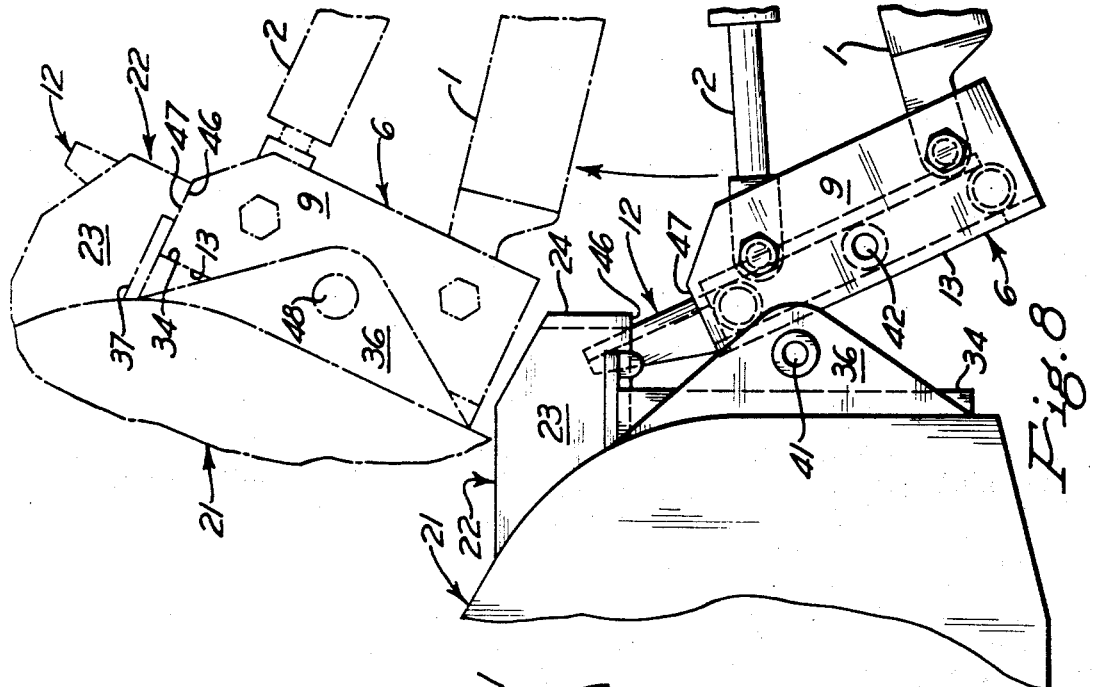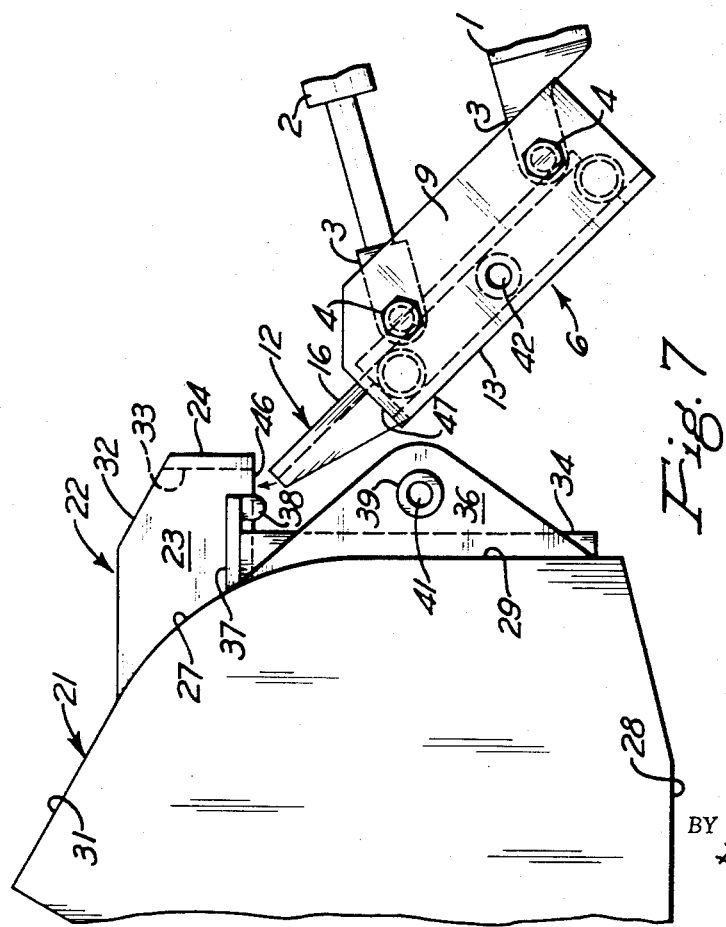

Dec. 24, 1968  C. F. STUART  3,417,886
IMPLEMENT HITCH FOR TRACTORS AND LOADERS
Filed June 7, 1967  4 Sheets-Sheet 4

INVENTOR.
CLIFTON F. STUART
BY
Brown, Critchlow, Flick & Peckham
ATTORNEYS.

United States Patent Office 3,417,886
Patented Dec. 24, 1968

3,417,886
IMPLEMENT HITCH FOR TRACTORS
AND LOADERS
Clifton F. Stuart, State St., R.D. 1, Box 20,
Kinsman, Ohio 44428
Filed June 7, 1967, Ser. No. 644,346
13 Claims. (Cl. 214—145)

ABSTRACT OF THE DISCLOSURE

A laterally extending frame is pivotally connected to the lifting and breakaway arms. A horn is rigidly mounted on the frame midway between its ends and extends above the frame when the latter is oriented in a generally vertical plane. A saddle is provided at the base of the horn. A horn receiver is rigidly mounted on the implement, the sides of the receiver converging to an apex that is spaced from the implement to provide a generally triangular opening with the apex located midway between the sides of the implement and preferably normally above its center of gravity. Locking means are provided for locking the frame and implement together at spaced lateral points below the saddle.

Background of the invention

Tractors and loaders are versatile pieces of equipment suitable for a variety of applications, as determined by the implements attached to them. For example, for a loader the appropriate implement may be a bucket, scraper, forklift, dozer blade, or the like. Ordinarily, such an implement is secured directly to the front end of the loader through a multipoint suspension that includes a pair of lifting arms and also one or more, generally two, breakaway arms that are adapted to extend and retract. The pivotal connections between the implement and the multipoint suspension involve a number of heavily loaded and continuously used bearing surfaces. To avoid undue wear of these surfaces, the interfitting parts must be machined to close tolerances and provided with continuous lubrication. Such connections cannot be quickly unmade and remade, so that changing implements involves considerable time and trouble.

It is among the objects of the present invention to provide a quick-hitch device for connecting a variety of implements to a tractor, loader, or similar vehicle, in which one portion of the device is connected directly to the multipoint tractor suspension and becomes an integral and permanent part thereof, while other and complementary portions of the device are permanently attached to an implement, or preferably to each of a plurality of implements, for the prompt and easy interchanging of those implements. A further object is to provide such a hitch device that will also permit the implement to be picked up and properly connected to the tractor even when the implement, before pick-up, is in any one of a variety of positions, none of which are aligned with the tractor about one or more of three mutually perpendicular axes. In other words, the hitch device of this invention is intended to be self-aligning to permit easy and rapid connection between tractor and implement. A still further object is to provide for easy locking of the implement to the tractor by means that need not be fitted to close tolerances.

Brief description of the drawings

A preferred embodiment of the invention is described herein in connection with the attached drawings, in which

FIG. 7 is an end elevation of both the implement-mounted and the tractor-mounted portions of the hitch device prior to hook-up;

FIG. 8 is a similar end elevation showing, first in solid lines and then in broken lines, subsequent stages in hooking-up the portions of the hitch device;

Description of the invention

Figure 1:
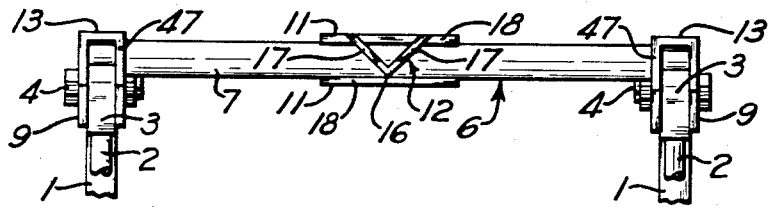
FIG. 1 is a plan view of that portion of the hitch device that is permanently connected to the tractor suspension, a fragmentary view of the latter being shown.

Referring to the drawings, a tractor-type vehicle (not shown), which for the purposes of this description will be referred to as a front end loader, is provided with a conventional four-point implement suspension system, which includes a pair of lifting arms 1 and a pair of breakaway arms 2. The lifting arms are adapted to be raised and lowered and the breakaway arms to be extended and retracted. In each case, the described movements may be effected by conventional hydraulic means. The ends of each of the lifting and breakaway arms are provided with conventional bushings 3, which pivotally receive transverse pivot pins or bolts 4. Instead of attaching the ends of the arms directly to the implement, as in conventional practice, they are attached to a frame member 6, constituting the tractor-mounted part of the hitch device of this invention. The frame member includes horizontal members 7 and 8, shown in the drawings as round tubes; side or end members 9, in the form of channels with their flanges extending rearwardly; and two central reinforcing plates 11; and a horn 12. These parts may be welded together. The reinforcing plates 11 are welded to the front and back of horizontal members 7 and 8. As shown in FIG. 1, the front surfaces 13 of side members 9 lie in the same vertical plane and form bearing surfaces, the function of which is described later herein. The horn 12 may be formed from an angle mounted on end at the top of the frame with the apex or corner edge 16 of the angle towards the back of the frame and substantially midway between the ends or sides of the frame. The flanges of the horn may have upwardly and inwardly tapered edges 17. The top of the horn extends above the other portions of the frame and acts as a centering and aligning member, as described later herein. At the base of the horn, the adjacent top portion of the frame (here the top edges of plates 11) forms a saddle 18, projecting laterally of the horn base.

Figure 4:
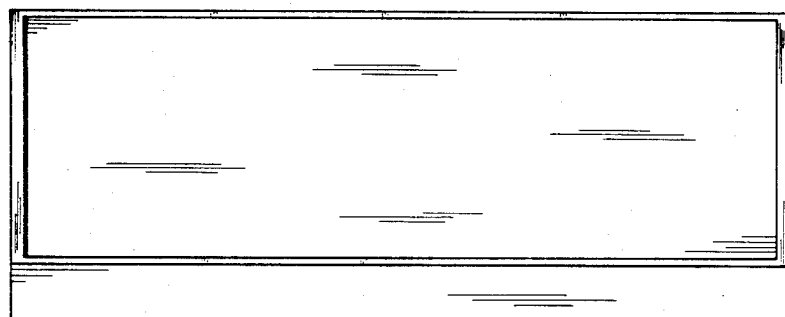
FIG. 4 is a plan view of an implement and other portions of the hitch device that are permanently attached to the implement.
Figure 5:
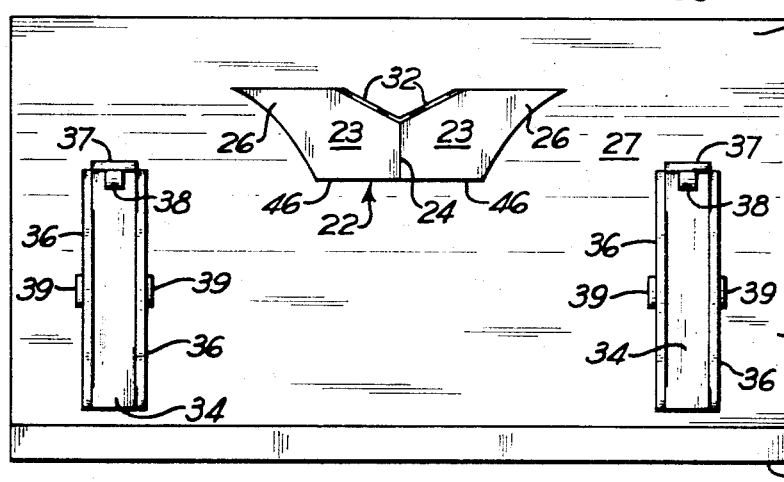
FIG. 5 is a rear elevation of the implement and hitch portion of FIG. 4.
Figure 6:
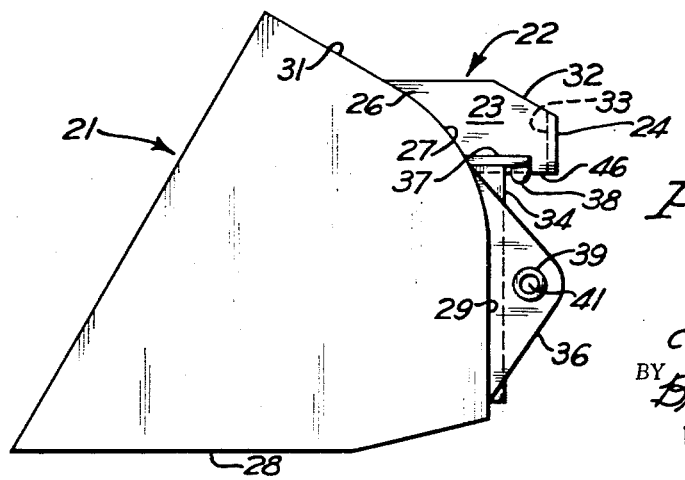
FIG. 6 is an end elevation of the same portions.

FIGS. 4–6 show various views of an implement, illustrated here in the form of a bucket 21, that is to be connected to the loader. Complementary portions of the hitch device are secured to the bucket for effecting that connection. Those portions include a horn receiver 22, in the form of a generally V-shaped member with sides 23 that converge to an apex 24. The divergent ends 26 of the receiver are welded to the somewhat curved upper back portion 27 of the bucket. The shape of the bucket is conventional; it has a flat bottom 28 and flat back portions 29 and 31, with the curved back portion 27 lying between the flat back portions. The horn receiver 22 is preferably located with the apex 24 lying in or close to the vertical plane containing the center of gravity of the bucket and above that center when the bucket is in the position shown in FIG. 5. If desired, the sides 23 of receiver 22 adjacent the apex 24 may be tapered along their upper edges to provide downwardly sloping edges 32, as shown in FIGS. 5 and 6. Apex 24 has an inside corner or edge 33, which is adapted to be engaged by the back edge 16 of horn 12.

Figure 3:
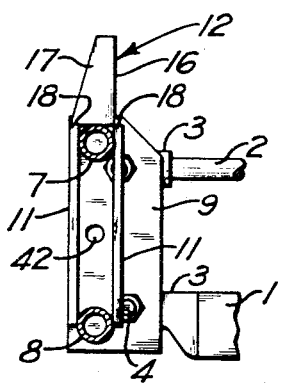
FIG. 3 is a sectional elevation along the line III—III of FIG. 2.

Attached to the back of the bucket and spaced on either side of the corner edge 33 of the horn receiver apex 24 are two vertically extending bearing strips 34. The rear faces of those strips are adapted to register with and engage (at least in line contact with, or preferably in surface contact with) the bearing surfaces 13 on the side members 9 of frame member 6 (attached to the loader) when the implement is hooked up. Accordingly, the faces of strips 34 preferably lie in the same plane, that being a plane parallel to the corner edge 33 of the horn receiver. In many cases, these strips can be omitted, and the back of the bucket itself can provide the bearing lines or faces. In either case, the apex corner 33 on the horn receiver 22 is spaced behind the bearing faces (i.e., the faces of bearing strips 34 or the equivalent surfaces of the back of the bucket) a distance slightly greater than the distance between the back edge 16 of horn 12 and the bearing surfaces 13 of side members 9 on frame 6 (see FIGS. 1 and 3).

Figure 2:
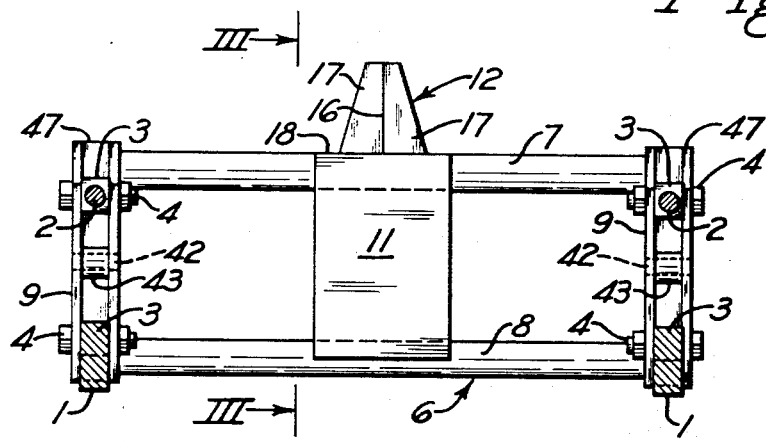
FIG. 2 is a rear elevation of the hitch and suspension shown in FIG. 1.

Along each vertical edge of strips 34 are welded locking ears 36. These ears are adapted to register in nesting relation with side members 9 on the frame portion 6 of the hitch (see FIG. 9). Welded to the top of each bearing strip 34 and extending perpendicular thereto and with their forward ends welded to the back of the bucket are stop members 37 for limiting upward movement of channel members 9 when they are slidably nested between locking ears 36. If desired, a downwardly extending lug 38 with suitably rounded edges may be welded to the rear portion of these stop members to limit fore-and-aft separation of the bearing strips 34 and bearing surfaces 13 prior to locking frame member 6 to the bucket. Each pair of locking ears is also provided with locking bushings 39, with holes 41 extending through the ears and bushings to receive a locking bolt or pin. Holes 41 are in registry with complementary holes 42 in the flanges of the channel members 9 and in pin bushings 43 welded between those flanges. (See FIG. 2). The registration of holes 41 and 42 occurs when frame member 6 has been properly nested in the mating hitch devices on the bucket, as explained below.

The complementary parts of the hitch device may be interconnected in accordance with the following procedure. Assume the bucket is detached from the loader and resting on the ground as shown in FIG. 7, so that bearing strips 34 are in a substantially vertical plane and the horn receiver 22 extends rearwardly of the bucket in a generally horizontal plane. The loader is moved by the operator behind the bucket. Frame member 6 is then manipulated by the lifting and breakway arms until it is inclined forwardly with the top of horn 12 below and pointing towards the generally triangular opening 43 defined by the sides 23 of the receiver and the subtended portion 44 of the bucket between the ends 26 of the receiver (see FIG. 4). In this position, the horn projects ahead of other portions of frame member 6, which cannot therefore interfere with the insertion of the horn into the opening of the horn receiver. The solid line portion of FIG. 8 shows the relative position of the parts just after the top (or forward) end of the horn has been inserted in the receiver opening and after the frame 6 has been lifted or tilted backwards so that the back edge 16 of the horn is in contact with the bottom of the inner edge 33 of the receiver apex. Such contact is assured, because the sides 23 of the receiver positively guide the horn into engagement with the apex of the receiver, there being sufficient force involved in the lifting and breakaway arms to move the bucket, if need be, to do this.

As the frame member 6 is lifted above the position shown in solid lines in FIG. 8, and as the top of the frame is tilted more rearwardly, it will be apparent that the bucket will first be moved slightly backwards (perhaps after being initially tilted slightly forward by the lifting action of the horn), until finally the bottom of apex 24 of the horn receiver will engage a portion of the saddle 18 on the frame member. Thereafter, continued elevation of the frame member or further tilting of it backwards (or a combination of these motions) will cause the bottom of the bucket to swing rearwardly about some point or line of engagement (which may shift from moment to moment) between the horn receiver on the one hand and the saddle or the horn on the other hand. During this operation, the bucket will align itself about the yaw, roll, and pitch axes until the complementary mating parts of the hitch device are brought into final aligned engagement.

To analyze the aligning features of the invention in more detail, consider first the alignment of the hitch parts about the yaw axis (the conventional z-axis of three dimensional space). Assume initial misalignment about that axis, as where the implement is turned so that one of its ends and the corresponding end of the frame are closer together than the other ends of those elements. The engagement of the flanges of the horn 12 with the sides 23 of the receiver adjacent the receiver apex 24 will tend to rotate the bucket about the edge 16 on the back of the horn as the horn is lifted and tilted backwards, until finally the back of the bucket (or bearing strips 34 thereon) and the bearing surfaces 13 on frame member 6 are brought into engagement. This centering action begins as the back of the horn approaches the apex of the horn receiver (solid lines, FIG. 8) with the horn inclined forwardly, and continues as the horn is lifted or tilted backwards to or beyond a vertical position (broken lines, FIG. 8) when the flanges of the horn are finally brought into full overlapping, nested engagement with the sides of the horn receiver (see also FIG. 9). It will be noted that the initial engagement between the horn flanges and the complementary sides of the receiver (both the receiver and the horn having sides or flanges that converge at the same angle, here 90°, towards an apex) occurs near the bottom of both elements, where the flanges or sides of the horn have their greatest width and therefore their greatest aligning effect.

Consider next the alignment between the frame and the implement about the roll axis (the conventional y-axis of three-space), as when one end of the bucket is initially higher than the corresponding end of the frame member. In this case, alignment is effected not only by engagement between the flanges of the horn and the mating surfaces of the horn receiver as described above (only now about a different axis), but also by the engagement of the bottom edges 46 of the sides 23 of the receiver with the saddle 18 on the frame. In other words, the bucket centers itself on the saddle about the horn, because the apex of the horn receiver lies substantially on the fore-and-aft vertical plane passing through the center of gravity of the bucket and is above (i.e., higher than) the center of gravity when the bucket is in the position shown in FIG. 5. Accordingly, the bucket will level itself relative to the frame about the roll axis even before the bottom of the bucket swings backwards into engagement with the lower part of the frame. This permits the tops 47 of the end or side members 9 on the frame to pass under the lugs 38 (if those are present) and engage the underside of stops 37 on the bucket before the latter swings fully into its final position.

Lastly, consider the alignment between the bucket and the frame member about the pitch axis (the conventional x-axis of three-space), as where the bucket is lying with its horn receiver extending downwardly below the horizontal (as if tilted slightly backwards in FIG 7). Alignment here is effected by rotation of the bucket about the lower back edge 16 of the horn when the latter is lifted and tilted backwards, causing the bottom of the bucket to swing to the rear until bearing plates 34 engage bearing surfaces 13.

Figure 9:
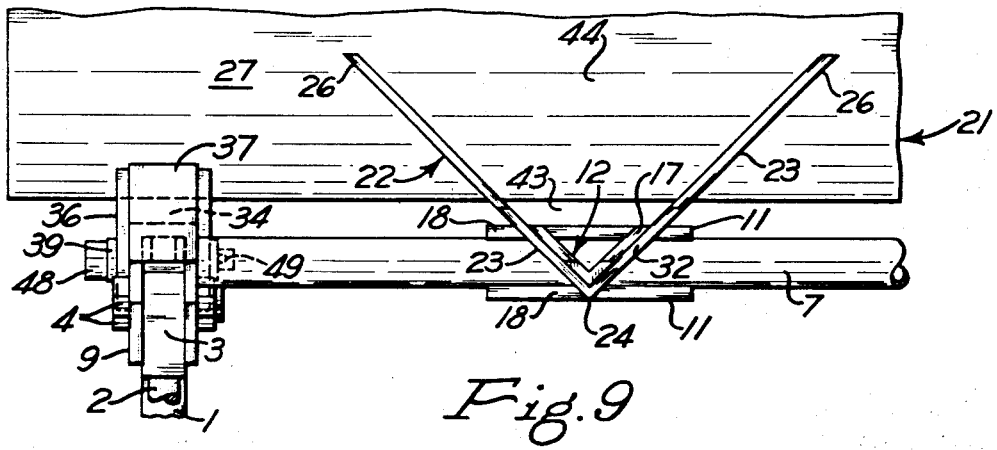
FIG. 9 is a partial plan view of the hitch device after it has been connected together.
Figure 10:
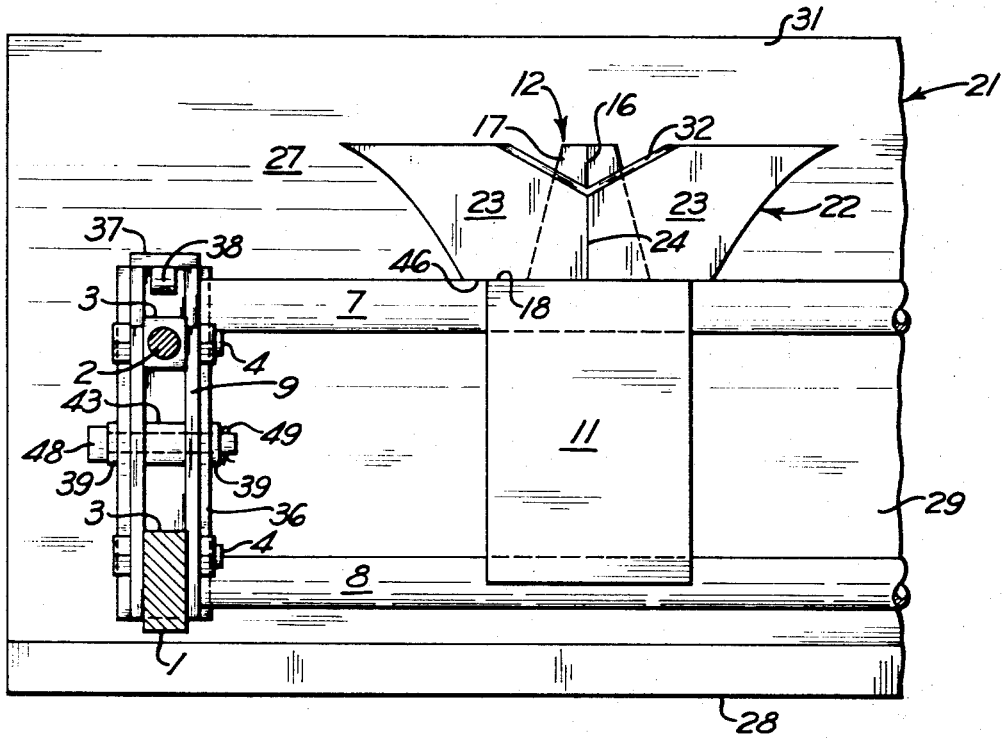
FIG. 10 is a rear elevation of the hitch device of FIG. 9.

When the bucket is fully aligned and the various mating parts of the hitch are engaged (as shown in FIGS. 9 and 10, and in broken lines in FIG. 8), a locking pin 48 can be put through the registering holes 41 and 42 and held by a cotter pin 49. Only the simplest form of locking device has been shown in the drawings, but it will be obvious to those skilled in the art that remotely controlled locking means, operable from the seat of the loader, could be used to effect the same result, i.e., a positive latching between the bucket and the frame member at laterally spaced points below the saddle. This arrangement provides a three-point interconnection between the mating portions of the hitch device and permits the operator to manipulate the bucket in the same way as if conventional practice were followed and the bucket had been connected directly to the lifting and breakaway arms of the loader.

It is among the advantages of the present invention that the interconnections between the loader and the frame member 6 are substantially permanent connections that can be fitted to close tolerances and provided with the usual means (not shown) for continuous lubrication of the pivot bushings, just as is conventionally done with connections made directly between the loader arms and the bucket or other implement. In other words, the wear on the heavily loaded bushings and bushing pins at the ends of the lifting and breakaway arms is no greater when using the hitch of this invention than when those arms are directly connected to the implement. More significantly, the present invention permits coupling the frame portion of the hitch to the complementary portions mounted on a variety of implements, so that the implements can be interchanged with a minimum of time and trouble and without disconnecting the permanent connections between the loader and the frame portion of the hitch. Moreover, because of the aligning features inherent in the interaction between the converging flanges of the horn 12 and the similar converging sides 23 of the horn receiver 22, and also between the bottom of the horn receiver and the saddle, the implement will properly center itself on the frame member and properly align itself therewith, regardless of initial misalignment about the pitch, roll, and yaw axes.

It should be noted that the holes 41 and 42 for receiving locking pins 48 can be located to permit either a little or substantial play about the axis of those pins between the implement and the frame member. If the holes are located so that bearing surfaces 13 on the frame are spaced close to the faces of bearing strips 34, there will be only limited play or rocking as permitted first by top and then by bottom engagement of those surfaces and faces. (Play in one direction may also be limited by engagement of the horn edge 16 with edge 33 of the receiver apex.) If such spacing is less close, there will be more play. Under certain conditions, substantial play may be desirable, because it permits cleaning the bucket by shaking it with appropriate sudden movements of the suspension arms on the tractor. In many cases, this is a better way to dislodge dirt or other substances than by banging the bucket on the ground.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:
1. A quick hitch device for connecting an implement to a tractor where the tractor is provided with a pair of lifting arms and at least one breakaway arm adapted to extend and retract, the ends of said arms defining a multipoint suspension, said device, in combination with the foregoing elements, comprising: a laterally extending frame, spaced portions of which are pivotally connected to the lifting and breakaway arms so that the frame can be lifted and tilted backwards and forwards about an axis passing through the pivotal connections between the frame and the lifting arms, a horn rigidly connected to the frame substantially midway between its ends and extending above the frame when the frame is oriented in a generally vertical plane, a horn receiver rigidly mounted on the implement and having sides that converge to an apex, the apex being spaced from the implement to provide a generally triangular opening bounded by the converging sides of the receiver and by the subtended portion of the implement, the apex of the receiver being located substantially in a fore-and-aft normally vertical plane containing the center of gravity of the implement and normally above said center of gravity when the receiver is disposed generally horizontally, the horn extending into the opening of the receiver from below with the sides of the horn engaging the sides of the receiver adjacent the apex, a saddle on the frame supporting the bottom of the receiver, and means locking the frame and implement together at laterally spaced points below the engaged horn and receiver.

2. A hitch device according to claim 1, in which the horn has sides converging to an apex at the same angle as the sides of the receiver adjacent the apex of the latter.

3. A hitch device according to claim 2, in which the horn has sides converging at an angle of substantially 90°.

4. A hitch device according to claim 1 that also includes at least two bearing members on the implement normally engaging similar members on the frame, said members being located on opposite sides of the engaged horn and receiver and normally below the saddle.

5. A hitch device according to claim 1 that also includes a stop member disposed on each side of the engaged horn and receiver to limit relative rotation between frame and implement about a longitudinal roll axis perpendicular to the general plane of the frame prior to locking the frame and implement together.

6. A quick hitch device for use with a tractor provided with a pair of lifting arms and at least one breakaway arm, the ends of said arms defining a multipoint suspension, said device comprising: a laterally extending frame member that is adapted to be connected to said arms for lifting the frame and tilting it backwards and forwards about an axis passing through the connections between the frame member and the lifting arms, a horn rigidly connected to the top of the frame member substantially midway between the ends of said member and having sides converging towards the tractor when the frame member is oriented in a generally vertical plane, an implement member, a horn receiver rigidly mounted on the implement member and having sides that converge to an apex away from the implement member at substantially the same angle as the converging sides of the horn, the converging sides of the receiver and the subtended portion of the implement member defining a generally triangular opening, the apex of the receiver being located substantially midway between the sides of the implement member and above its center of gravity when the receiver is disposed generally horizontally, whereby when the horn is inserted into the opening defined by the receiver, and when the frame member on the tractor is then raised, the horn will be directed by the converging sides of the reeciver towards the apex and further lifting of the frame member or tilfting of the top thereof towards the tractor will cause the portion of the implement member below the horn to swing by its own weight against the frame member, means on at least one of said members for limiting penetration of the horn into said opening, and means for locking the frame member to the implement member at spaced points normally below the engaged horn and receiver.

7. Apparatus according to claim 6, in which said horn penetration limiting means include a saddle on the frame member adjacent the horn member for engaging a portion of the horn receiver when the horn has been fully inserted therein.

8. Apparatus according to claim 6 that also includes additional means for limiting rotation of one of said members relative to the other member about an axis generally perpendicular to the plane of the frame member and adjacent to the horn member.

9. Apparatus according to claim 8, in which said additional means include stops projecting from one of said members and engageable with the other member when said members are in aligned engagement.

10. Apparatus according to claim 6 that also includes means mounted on one of said members and engageable with the other member for limiting independently of said locking means the fore-and-aft separation of those portions of said members normally located below the engaged horn and receiver.

11. Apparatus according to claim 6 in which the locking means include separate means mounted on the frame and implement members that are adapted to overlap when said elements are aligned and pin means for securing their mutual overlap.

12. A quick hitch device for use with a tractor provided with a pair of lifting arms and at least one breakaway arm, the ends of said arms defining a multipoint suspension, said device comprising: a laterally extending frame member that is adapted to be connected to said arms for lifting the frame and tilting it backwards and forwards about an axis passing through the connections between the frame member and the lifting arms, a male positioning member rigidly mounted on the frame member substantially midway between the ends of the frame member and normally above that member, the male member having sides converging to an apex, an implement member, a female receiver rigidly mounted on the implement member and having sides that also converge to an apex at substantially the same angle as the converging sides of the male member to define a generally triangular opening, the apex of the receiver being located substantially midway between the sides of the implement member and normally above its center of gravity, the male member being insertable into the opening of the receiver by manipulating the frame member with the lifting and breakaway arms, to bring the apex and converging sides of the receiver into engagement with the apex and converging sides of the male member thereby to align the implement member with the frame member, means for pivotally locking the implement member to the frame member at spaced lateral points below the tops of said members, a bearing surface on the frame member, and a separate bearing surface on the implement member, the two bearing surfaces being adapted to come into engagement when the implement member rocks in one direction relative to the frame member about the locking means thereby permitting jarring of the implement member against the frame member to clean the former.

13. Apparatus according to claim 12, in which the bearing surfaces are located between the pivotal locking means and the tops of the implement and frame members.

No references cited.

HUGO O. SCHULZ, *Primary Examiner.*

U.S. Cl. X.R.

213—61;172—272; 280—479